J. H. MÜLLER.
MICROMETER CALIPERS.
APPLICATION FILED JULY 21, 1915.
1,188,978.
Patented June 27, 1916.
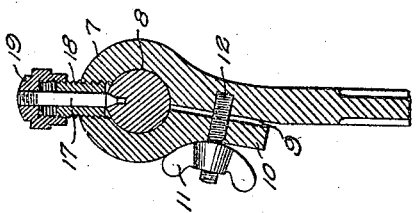
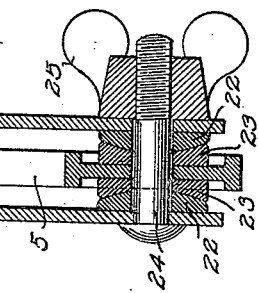
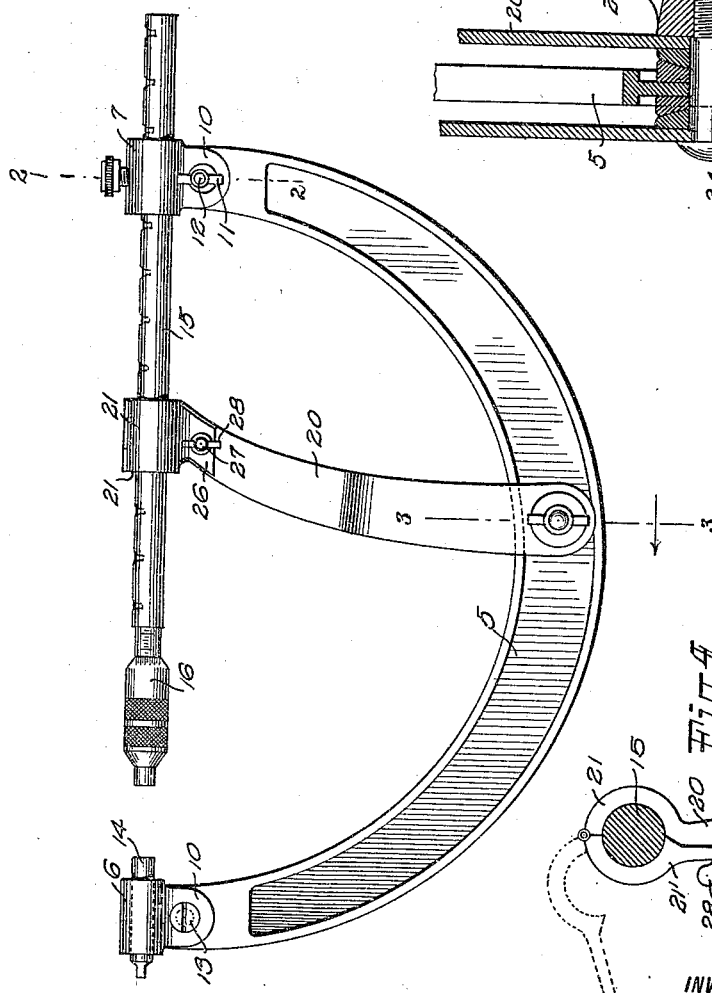
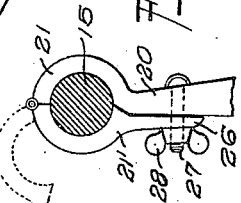
WITNESSES
William P. Goebel.
INVENTOR
J. H. Müller
BY Munn & Co
ATTORNEYS

UNITED STATES PATENT OFFICE.

JOSEPH H. MÜLLER, OF OAKLAND, CALIFORNIA.

MICROMETER-CALIPERS.

1,188,978.  Specification of Letters Patent.  Patented June 27, 1916.

Application filed July 21, 1915. Serial No. 41,086.

*To all whom it may concern:*

Be it known that I, JOSEPH H. MÜLLER, a citizen of the United States, and a resident of Oakland, in the county of Alameda and State of California, have invented a new and Improved Micrometer-Calipers, of which the following is a full, clear, and exact description.

My invention relates to micrometer calipers of the large type, and has reference more particularly to an improvement on my Patent No. 1,075,929 issued October 14, 1913.

The object of the invention is to provide an inexpensive micrometer caliper, simple and solid in construction, having a measuring point and a graduated rod provided with a micrometer measuring point and removable from the caliper frame.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is an elevation of an embodiment of my invention; Fig. 2 is a section on line 2—2, Fig. 1; Fig. 3 is a section on line 3—3, Fig. 1; and Fig. 4 is a detail view of the head of the reach rod.

Referring to the drawings, 5 represents a U-frame combining rigidity, strength and lightness and provided with machined heads 6 and 7 at the extremities. The heads have bores 8 about a common axis, and each is provided with a slit 9 leading from the lower part of the head up to the bore, as best seen in Fig. 2. The flange 10, resulting from the slit, constitutes a resilient portion of each head whereby the size of the bore 8 in the head 7 can be varied by means of a butterfly nut 11 threaded onto a stud 12 threaded into the frame and passing through the flange 10. The bore of the head 6 can be varied by means of a cap screw 13 engaging a flange 10 of the head 6.

Clamped in the bore of the head 6 is a measuring point 14. Fitted into the bore of the head 7 is a measuring rod or arbor 15 of uniform diameter and provided at the end facing the measuring point 14 with a micrometer gage 16. The arbor is divided from end to end by a number of equally-spaced openings, said openings being flared, as indicated in the drawings, to receive the point of a pin 17. The pin is guided within a nipple 18 threaded into the head 7 and projecting therefrom. Threaded on to the projecting end of the nipple is a cap 19 to which the pin 17 is secured so as to turn therewith.

When small measurements are to made, the arbor 15 is prevented from deflection during the measurement by a reach rod 20. The head 21 of the rod has a bore into which the arbor fits snugly when said head alines with the bores 8 of the heads 6 and 7. The head 21 of the reach rod is formed of two sections, the section 21' of which is hinged to the other section forming part of the rod. The section 21' has a flange 26 adapted to engage a threaded stud 27 secured to the rod, and on which a butterfly nut 28 is provided so as to clamp the section 21' to the rod. The rod 20 straddles the frame 5, as shown in Fig. 3, and between the straddling portions of the rod and the sides of the frame, washers 22 and 23 are provided, the contacting surfaces of said washers being spherical. Passing through the washers, frame, and the rod is a bolt 24 provided with a butterfly nut 25, whereby the rod can be clamped to the frame 5. By providing contacting spherical surfaces between the washers 22 and 23, the head 21 can be more easily adjusted or alined with the bores 8 of the heads 6 and 7.

I claim:

1. A device of the class described comprising,—a U-frame, heads at the extremities having axial bores adapted to receive measuring points, a measuring arbor in the bore of one of said heads, a reach rod straddling said frame and having a bored head, washers interposed between the straddling portion of the reach rod and the frame, said washers having spherical contacting surfaces, and clamping means passing through the rod, washers and frame for clamping the rod to the frame, whereby the bore of the head of said rod may be alined with the bores of the heads of the U-frame, said bore of the reach rod being adapted to engage the measuring arbor, substantially as and for the purpose set forth.

2. A device of the class described comprising,—a U-frame, heads at the extremities of said frame having alining bores adapted to receive measuring points, a measuring arbor in the bore of one of said heads, said arbor being divided by a number of equally-spaced openings, said openings being flared, a nipple threaded into the head where the arbor is provided and adapted to register with the flared portions of the arbor, a needle guided by said nipple and adapted to engage the flared portion of the arbor, a cup carried by said needle and adapted to engage the nipple and whereby the needle can be moved in and out of the nipple to disengage the needle from the flared portions of the arbor, a reach rod pivotally connected to the frame and having a bored head adapted to engage the arbor, and means for clamping the reach rod and the frame on their pivot.

3. A device of the class described comprising,—a U-frame having bored heads at the extremities, the axes of which aline, a measuring arbor in the bore of one of said heads, a reach rod associated with the frame having a bored head formed of two hinged sections adapted to engage the measuring arbor, means for clamping said sections together, and means for clamping the reach rod to the frame, whereby the bore of the head of the reach rod can be alined with the bored heads of the frame to engage the measuring arbor and whereby the same is prevented from deflection.

In testimony whereof I have signed my name to this specification in the presence of two subscribing witnesses.

JOSEPH H. MÜLLER.

Witnesses:
B. S. McArthur,
M. Hagquist.

Copies of this patent may be obtained for five cents each, by addressing the "Commissioner of Patents, Washington, D. C."